No. 870,339.　　　　　　　　　　　　　　　　　PATENTED NOV. 5, 1907.
C. W. BECK.
JOINT RING FOR ACETYLENE GAS LAMPS.
APPLICATION FILED DEC. 22, 1906.
2 SHEETS—SHEET 1.
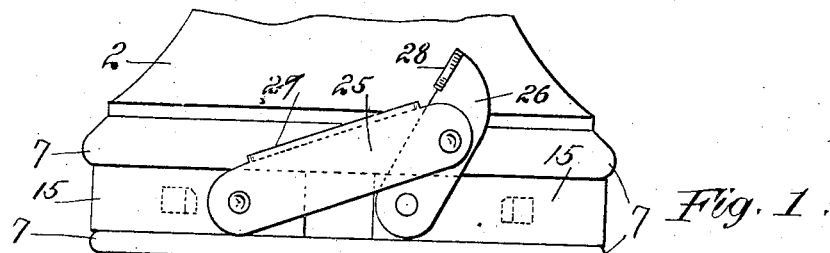
Fig. 1.
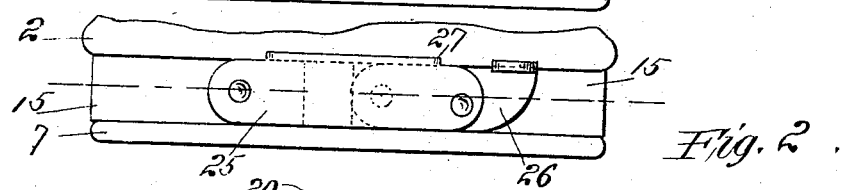
Fig. 2.
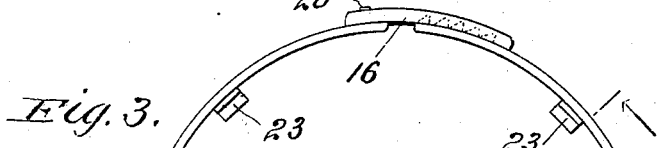
Fig. 3.
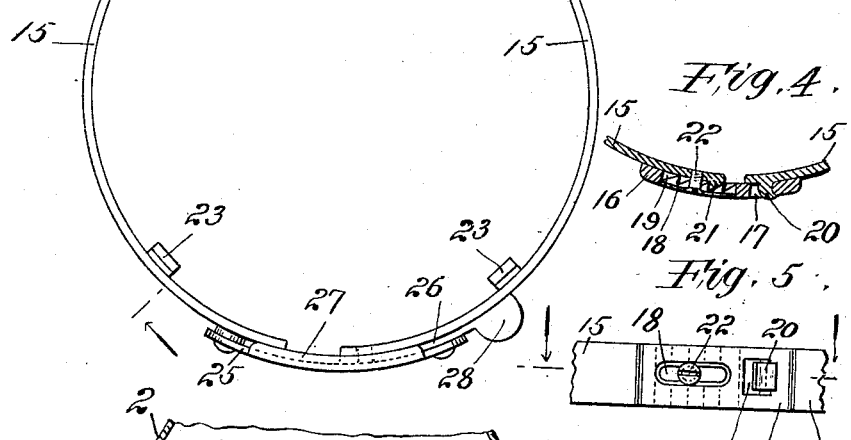
Fig. 4.
Fig. 5.
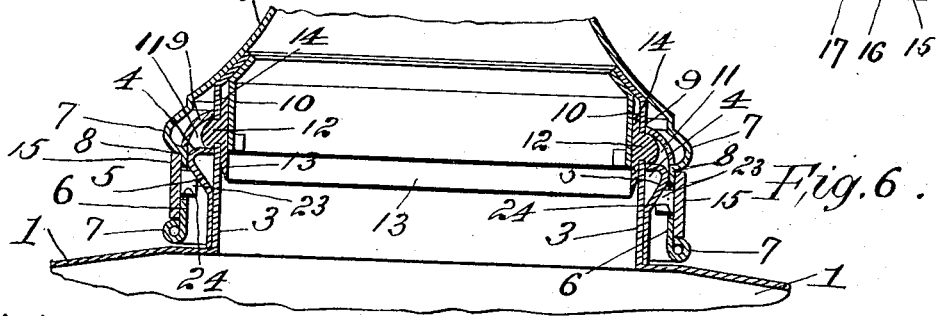
Fig. 6.
Witnesses　　　　　　　　　　　　　　　Chas. W. Beck, Inventor
　　　　　　　　　　　　　　　　　　　　By his Attorneys No. 870,339. PATENTED NOV. 5, 1907.
C. W. BECK.
JOINT RING FOR ACETYLENE GAS LAMPS.
APPLICATION FILED DEC. 22, 1906.

2 SHEETS—SHEET 2.

Witnesses
Inventor
Chas. W. Beck
By his Attorneys

UNITED STATES PATENT OFFICE.

CHARLES W. BECK, OF ROCKVILLE CENTER, NEW YORK.

JOINT-RING FOR ACETYLENE-GAS LAMPS.

No. 870,339.  Specification of Letters Patent.  Patented Nov. 5, 1907.

Application filed December 22, 1906. Serial No. 349,067.

*To all whom it may concern:*

Be it known that I, CHARLES W. BECK, a citizen of the United States, residing at Rockville Center, in the county of Queens and State of New York, have invented certain new and useful Improvements in Joint-Rings for Acetylene-Gas Lamps, of which the following is a specification, reference being had therein to the accompanying drawings, in which—

Figure 7:
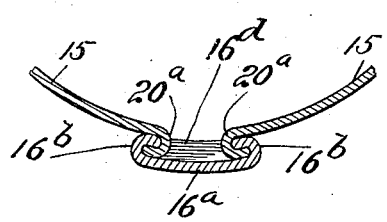
Figure 8:
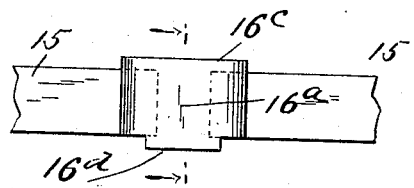
Figure 9:
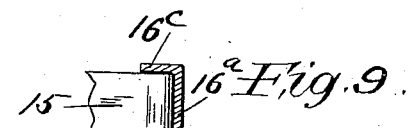
Figure 10:
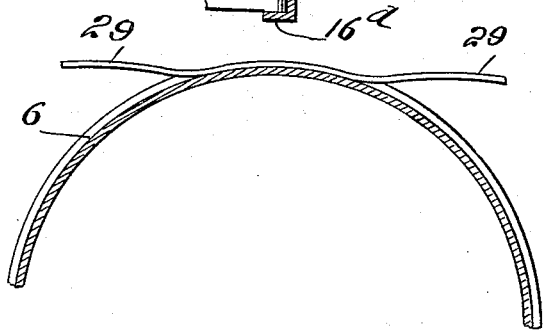

Figure 1 is a side elevation of the joint ring showing it in its released position; Fig. 2 a similar view showing the ring in its closed or clamping position; Fig. 3 a plan view of the ring; Figs. 4 and 5 detail views of the means for adjustably connecting together the ends of the two sections of the ring; Fig. 6 a vertical sectional view of a portion of an acetylene gas lamp; Fig. 7 a horizontal sectional view showing a modified form of the device for flexibly connecting the ends of the two sections of the clamping ring; Fig. 8 a side elevation thereof; Fig. 9 a vertical sectional view thereof; and Fig. 10 a horizontal sectional view of a portion of the lamp showing a spring for expanding the clamping ring when said ring is released.

This invention relates generally, to means for connecting together two telescoping parts to form a gas-tight joint; and it relates, specifically, to means for detachably connecting together the upper and lower parts of an acetylene gas lamp of the type shown in my Patent Number 790,868, dated May 23d, 1905.

One of the main objects of the invention is to provide a connecting ring for lamps of the class shown in my said patent, by which the two parts of the lamp may be quickly and rigidly connected together.

Another object of the invention is to provide a clamping ring by which two telescoping parts may be drawn together with considerable force so that by the interposition of a flexible yielding gasket between the two parts a gas tight connection may be quickly made.

Other important objects and advantages of the invention will appear hereinafter.

Referring to the various parts by numerals, 1 designates the upper portion of the base or water holder of the lamp, and 2 the lower portion of the carbid holder or upper part of the lamp. The clamping ring is designed to connect these two parts together and to form a gas tight joint therebetween. The upper part of the base or water holder is contracted and is formed with an upward extending short cylindrical part 3 which is open at its upper and lower ends and through which access is had to the interior of the water holder. At the top of this cylindrical part 3 on the exterior thereof is formed an outward extending horizontal bead or flange 4 which is inwardly and downwardly inclined on its lower side to form an annular cam surface 5, the upper surface of said bead, where it joins the part 3, being substantially flat and slightly below the upper edge of said part 3, as shown clearly in Fig. 6. The lower end of the upper part 2 of the lamp is formed with a cylindrical part 6 which is slightly larger in internal diameter than the diameter of the bead or flange 4, so that said part 6 may fit down over said bead, as shown clearly in Fig. 6, so that the part 3 telescopes within the part 6. This cylindrical part 6 at its upper and lower ends is provided with annular exterior beads 7 to form an annular channel 8. At the upper end of, and within, this cylindrical part 6 are secured two annular strips 9 and 10 which form an annular interior channel 11. Within this channel is secured a gasket or packing ring 12, said ring being provided with a depending annular part or member 13 which fits within the cylindrical part 3 of the base of the lamp, the main body of the gasket engaging the upper edge of said part 3 and bearing on the upper surface of the flange 4, as shown clearly in Fig. 6. The gasket is provided on its upper surface with an annular extension 14 which fits between the two parts 9 and 10 above the chamber 11, and serves to aid in holding the gasket in position in said channel 11. It will, of course, be understood that while I prefer to use this form of gasket, the connecting means will operate successfully with any suitable gasket.

In the channel 8 formed by the beads 7 is mounted a clamping ring 15. This ring is formed in two sections flexibly and adjustably connected together by means of a hinge plate 16 which is formed with an aperture 17 and with a longitudinal slot 18 and transverse ratchet teeth 19 on its inner surface adjoining the slot 18. One end of one section of the ring 15 is formed with an outward turned hook 20 which is adapted to engage in the aperture of the hinge plate; and the other section of the clamping ring is provided at one of its ends with a ratchet tooth or lug 21, which is adapted to engage the teeth 19 on the hinge plate. To adjustably connect the hinge plate to one section of the connecting ring is screw 22 which is passed through the slot 18 of the hinge plate and threaded into the section of the connecting ring, as shown clearly in Figs. 4 and 5. By this means the clamping ring may be adjusted to slightly vary its diameter to compensate for the wear of the packing ring, it being, of course, obvious that when said ring has become worn the clamping ring must be made smaller in order to draw the packing ring or gasket down on the bead 4 and on the upper edge of the cylindrical part 3 of the base of the lamp.

The sections of the clamping ring are each provided with two inward extending clamping lugs 23 which are beveled on their inner surface downwardly and inwardly to adapt them to firmly engage the downward and inward inclined under surface 5 of the clamping flange or bead 4. These clamping lugs extend inward through apertures 24 formed in the cylindrical part 6 of the upper part of the lamp, as shown clearly in Fig. 6.

For the purpose of contracting and expanding the clamping ring to cause the clamping lugs to engage, or be released from, the clamping flange, the two sections of the clamping ring are connected together by the link 25 and the lever 26. The link 25 is connected at one end to one section of the clamping ring and the lever 26 is pivoted at its end to the other section of the clamping ring, preferably near its free end. One end of the link 25 is connected to the lever at a point beyond its pivot and between its pivot and the handle part thereof, said point of connection between the link and the lever being so arranged that when the lever is thrown down, as shown in Fig. 2, to contract the clamping ring and to thereby force inward the clamping lugs against the clamping flange, the center of said pivot will be below a horizontal line passing through the center of the pivot of the lever with its section of the clamping ring and the center of the pivot of the link 25 to its section of the clamping ring. The object of this is to utilize the outward pressure on the lugs, which tends to expand the clamping ring, to hold the clamping means locked. In order to release the clamping means considerable upward pressure must be exerted on the end of the lever to throw the point of connection between the link and the lever above the point of connection between the lever and its section of the clamping ring. This is of great advantage as it prevents said ring being loosened accidentally. It will, of course, be understood, that by connecting the link 25 to the lever between its pivot and its free end the clamping ring will be expanded when the lever is moved upward and will be contracted when the lever is moved downward to a position horizontally in line with the clamping ring sections.

The link 25 is provided along its upper edge with an inward extending flange 27 which is adapted to engage the upper edge of the lever 26 when said lever is in its locked position, as shown clearly in Figs. 2 and 3, to prevent the further downward movement of said lever; and the lever is provided at its free end with a finger piece 28 by which it may be operated.

The parts are so proportioned, of course, that when the lever 26 is thrown up, as shown in Fig. 1, the clamping lugs will be moved outward sufficiently to release the clamping flange 4 and thereby permit the upper part of the lamp to be lifted off the base part or water holder.

By reason of the cam surface 5 of the bead under which the beveled part of the lugs engage, the lugs, when they are forced inward as described, will draw the upper part of the lamp down on the lower part thereof and cause the packing gasket 12 to be compressed over the edge of the part 3 and down on the bead 4, thereby securing an absolutely gas tight joint.

In Figs. 7, 8 and 9, a slightly different form of hinge plate is shown. In this construction the two portions of the clamping ring are formed with outward turned hooks 20ᵃ adapted to be engaged by the hinge plate 16ᵃ. This plate is provided at its vertical edges with inturned hooks 16ᵇ which interlock with the hooks 20ᵃ on the clamping ring. The hinge plate is provided with an upper horizontal flange 16ᶜ and with the lower flange 16ᵈ, this lower flange being bent under after the hinge plate has been carried down into engagement with the hooks on the ends of the clamping ring sections, to permanently connect said sections and the hinge plate.

If desired, the cylindrical part 6 of the upper section of the lamp may be provided with a flat spring 29 which will lie between said part 6 and the clamping ring to normally throw the sections of said ring outward. This is of advantage as it withdraws the lugs 23 from under the flange 4 when the clamp lever 26 is raised.

From the foregoing it will be seen that I provide a means for clamping together the two members of an acetylene gas lamp which does not require any careful adjustment of one of said parts on the other. It is not necessary that the lugs 23 should engage the flange 5 at any particular point. This is of great advantage in assembling the two parts.

Having thus described my invention, what I claim as new and desire to secure by Letters Patent, is:—

1. A joint ring for connecting together two members of an acetylene gas lamp comprising an upward extending cylindrical inner member formed on the lower part and provided with an outward extending flange at its top, an outer cylindrical member formed on the other part and adapted to fit over the inner member, a sectional clamping ring carried by the outer member and provided with cam lugs extending inward through slots in the outer member and adapted to engage the flange on the inner member, a packing ring carried by the outer member and adapted to rest upon the top of the flange of the inner member, and means for drawing together the sections of the clamping ring, whereby the cams will draw the packing ring against the flange on the inner member to form a gas tight joint.

2. A joint ring for connecting together two parts of an acetylene gas lamp or generator comprising an inner cylindrical member formed on one part of the lamp or generator and provided with an outward extending flange near its upper end, a cylindrical outer member formed on the other part and adapted to fit over the inner member, a clamping ring carried by the outer member and provided with cam lugs extending inward through slots in the outer member and, adapted to engage the flange on the inner member, a packing ring carried by the outer member and adapted to rest upon the flange of the inner member, and a lever device for drawing together the ends of the clamping ring, whereby the diameter of said ring will be reduced and the cams will draw the packing ring to the flange on the inner member.

3. A joint ring for connecting together two telescoping parts comprising an outward extending flange formed on the inner part, a clamping ring carried by the outer part and provided with cam lugs extending inward through the outer part and adapted to engage the flange of the inner part, a packing ring carried by the outer part and adapted to rest upon the flange of the inner part, and means for drawing inward the ends of the clamping ring.

4. A joint ring for connecting together two telescoping parts comprising an outward extending flange formed on the inner part, a sectional clamping ring carried by the outer part and provided with cam lugs adapted to extend inward through the outer part and adapted to engage the flange of the inner part, means for hinging together the ends of the sections of the clamping ring, and means for drawing together said sections, whereby the cam lugs will be caused to engage the flange on the inner part.

5. A joint ring for connecting together two telescoping parts comprising an outward extending flange formed on the inner part, a sectional clamping ring carried by the outer part and provided with cam lugs extending inward through the outer part and adapted to engage the flange on the inner part, means for hinging together the ends of the sections of the clamping ring, and a lever device for drawing together the sections of the clamping ring.

6. A joint ring for connecting together two telescoping parts comprising an outward extending flange formed on the inner part provided with an inclined cam surface, a sectional clamping ring carried by the outer part and provided with lugs extending through the outer part and adapted to engage the cam surface of the flange on the inner part, hooks formed on the ends of the clamping ring sections, a hinge plate engaging said hooks to flexibly connect the sections of the clamping ring, and means for drawing inward the sections of the clamping ring.

7. A joint ring for connecting together two telescoping parts comprising an outward extending flange formed on the inner part, a sectional clamping ring carried by the outer part and provided with cam lugs extending through the outer part and adapted to engage the flange on the inner part, adjustable means for hinging together the ends of the sections of the clamping ring, and a lever device for drawing together said sections, whereby the cam lugs will be caused to engage the flange on the inner part.

8. A joint ring for connecting together two telescoping parts comprising an outward extending flange formed on the inner part, a sectional clamping ring carried by the outer part and provided with cam lugs extending through the outer part and adapted to engage the flange on the inner part, a hinge plate connecting together the two ends of the clamping ring sections, a link connected to one of said sections, a lever connected to the other section, said link being also connected to the lever between its free end and its pivot and extending across the joint between the ring sections, whereby the clamping ring may be contracted by moving the lever.

9. A joint ring for connecting together two telescoping parts comprising an outward extending flange formed on the inner part, a two-part clamping ring carried by the outer part and provided with cam lugs extending through the outer part and adapted to engage the flange on the inner part, a hinge plate connecting together two ends of the clamping ring sections, a link pivoted to the other end of one of said sections, a lever pivoted to the free end of the other section, said link being also pivoted to the lever between its free end and its pivot near its lower edge and extending across the joint between the ring sections, for the purpose set forth.

10. A joint ring for connecting together two telescoping parts comprising an inner part provided with an outward extending flange, said flange being formed with an inclined cam surface, an outer part formed with two annular exterior beads forming a channel between them, a split clamping ring carried by the outer part and fitting the channel formed by said beads, cam lugs formed on said clamping ring and extending inward through the outer part and adapted to engage the cam surface of the inner part, a link pivoted to one end of the clamping ring, a lever pivoted to the other end of said clamping ring and extending back upon said ring, the link bridging the space between the ring ends and connected to the lever beyond its pivot whereby when the lever is brought into alinement with the ring the link will draw the ends of the ring toward each other.

11. A joint ring for connecting together two telescoping parts comprising an inner part provided with an outward extending flange, said flange being formed with an inclined cam surface, an outer part formed with two annular exterior beads forming a channel between them, a split clamping ring carried by the outer part and fitting the channel formed by said beads, cam lugs formed on said clamping ring and extending inward through the outer part and adapted to engage the cam surface of the inner part, a link pivoted to one end of the clamping ring, a lever pivoted to the other end of said clamping ring and extending back upon said ring, the link bridging the space between the ring ends and connected to the lever beyond its pivot, whereby when the lever is brought into alinement with the ring the link will draw the ends of the ring toward each other, an inward extending flange formed on the link adapted to engage the upper edge of the lever in its locked position to prevent further downward movement of said lever.

12. A joint ring for connecting two members of a gas container comprising two cylindrical members, one of said members being formed with a flange, a split clamping ring carried by the other member, lugs on said clamping ring extending inward through one member and adapted to engage the flange on the other member, and a lever device connected to the clamping ring and adapted to contract the same to cause the lugs to engage the flange to draw the two members toward each other.

13. A joint ring for connecting together two telescoping parts comprising an outward extending flange formed on the inner part, a clamping ring carried by the outer part and provided with cam lugs extending inward through the outer part and adapted to engage the flange of the inner part, a packing ring carried by the outer part and adapted to rest upon the flange of the inner part, and means for forcing inward the lugs of the clamping ring.

14. A joint ring for connecting together two telescoping parts comprising an outward extending flange formed on the inner part, a clamping ring carried by the outer part, cam lugs extending inward through the outer part and adapted to engage the flange of the inner part, a packing ring carried by the outer part and adapted to rest upon the flange of the inner part, and means for forcing inward the lugs of the clamping ring.

15. A joint ring for connecting two members of a gas container comprising two cylindrical members, one of said members being formed with a flange, a clamping ring carried by the other member, lugs extending inward through one member and adapted to engage the flange on the other member and a device connected to the clamping ring and adapted to force the lugs inward to draw the two members towards each other.

In testimony whereof I hereunto affix my signature in the presence of two witnesses this 20th day of December 1906.

CHARLES W. BECK.

Witnesses:
H. G. TUCKER,
NELLIE A. HARDENBERGH.